United States Patent [19]

Tomita

[11] 4,040,200
[45] Aug. 9, 1977

[54] PORTABLE CONTAINER FOR FISH, LIVE BAIT, AND THE LIKE

[76] Inventor: Shuzo Tomita, 122-1 Tomonaka, Kyowa, Obu, Aichi, Japan

[21] Appl. No.: 667,999

[22] Filed: Mar. 18, 1976

[30] Foreign Application Priority Data

Mar. 20, 1975 Japan .............................. 50-38069[U]
Mar. 20, 1975 Japan .............................. 50-38070[U]

[51] Int. Cl.² ............................................ A01K 97/04
[52] U.S. Cl. ...................................................... 43/57
[58] Field of Search ..................................... 43/57, 56

[56] References Cited

U.S. PATENT DOCUMENTS

| | | | |
|---|---|---|---|
| 2,007,326 | 7/1935 | Carpenter | 43/56 |
| 2,512,936 | 6/1950 | Harrison | 43/57 |
| 2,761,239 | 9/1956 | Stamps | 43/56 |
| 3,044,209 | 7/1962 | Roach | 43/56 |

Primary Examiner—Russell R. Kinsey
Assistant Examiner—Daniel J. Leach

[57] ABSTRACT

A portable container having a cylindrical body provided with a bottom plate and a top cover. The body has a cut-out at its lower portion which is covered by an outer flexible wall partially movable relative to the body. Upon the separation of the outer wall from the container wall, access is allowed to the interior of the container through the cut-out, and when the outer wall is not separated from the container wall a hermetically sealed condition is provided. The cover plate for the container element has at least one plug which is used to inject oxygen into the body and means is provided to allow drainage.

12 Claims, 11 Drawing Figures

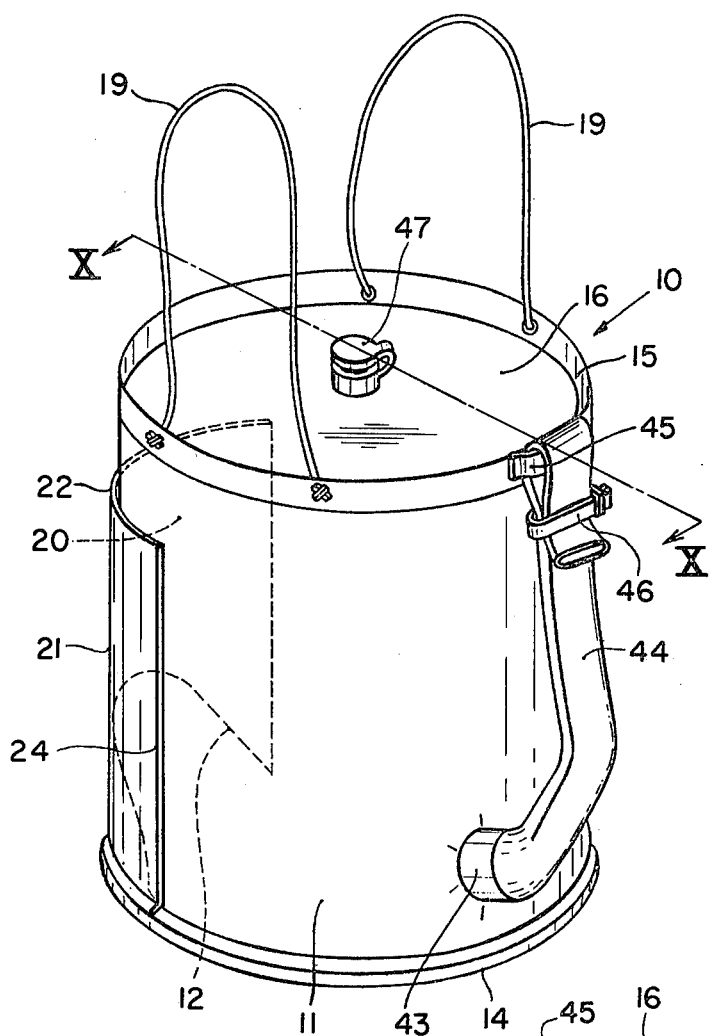
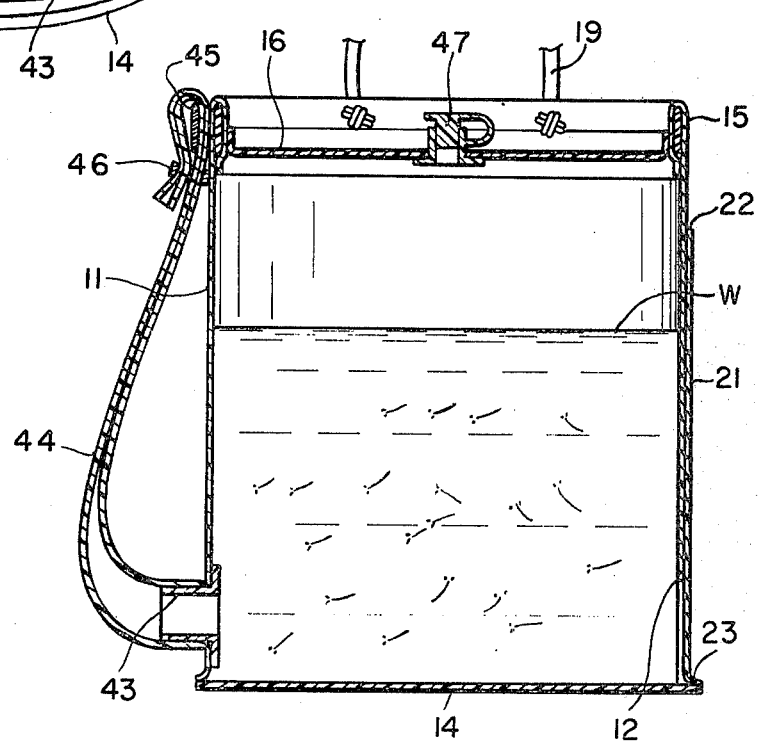

PORTABLE CONTAINER FOR FISH, LIVE BAIT, AND THE LIKE

BACKGROUND OF THE INVENTION

The invention relates to a portable container for transporting live fish, bait, and the like where it is necessary to keep the fish alive for a long period of time. The present invention has special use for transporting fish, from a hatchery to a stream for the stocking of the stream with young fish and for carrying fish or bait to and from fresh water fishing sites.

A recent method for transporting fish and keeping them alive during the transportation period utilizes a polyethylene bag which after being supplied with water, fish, and a sufficient supply of oxygen, may be hermetically sealed. However, upon opening of the polyethylene bag to remove a portion of the fish, or bait, all the oxygen stored therein escapes thereby necessitating the resupply of oxygen in order to maintain the remaining fish or bait alive. Since during an extended fishing trip or transportation to a stream access to a continuous supply of oxygen is not available, the maintenance of bait, fish and the like for long periods is most difficult.

The use of a polyethylene bag, therefore, is not very suitable for transporting fish to different locations where a portion of the fish contained in the bag is intermittently removed while the rest remain therein. One attempt to overcome this disadvantage has been to provide a more conventional canvas vessel mounted on a truck, car or the like. This canvas vessel is generally very large in size and is supplied with a cylinder of oxygen by which oxygen may be resupplied after the opening thereof and removal of a portion of the fish. However, due to the large size of the canvas vessel, it is both uneconomical to make and its use is limited, to the transport of large amounts of fish. As a result, when transferring a portion of the fish from the canvas vessel, the fish must first be placed in a smaller container, such as a bucket, increasing the chance of death due to insufficient oxygen supply. The canvas vessel also suffers from the drawback that as it is transported by the vehicle, the movement and vibration caused by the car will affect the water pressure within the vessel, so as to be potentially harmful to the fish. In addition, since the vessel is of such great size, it is not practicable to place the canvas vessel within a refrigerator as for cryostatic transportation.

It is, an object of the present invention to provide a portable apparatus for the transport of fish, live bait, and the like which allows for the transport thereof for a long time without those risks inherent in the prior art.

It is another object of the present invention to provide apparatus for the transport of fish and the like which allows for the insertion of a hand into the container, or for the removal of a portion of the fish without adversely affecting the oxygen supply.

It is still another object of the present invention to provide a portable transport container for fish and the like, that is easily resupplied with fresh oxygen and which forcibly circulates the oxygen in the container to insure a proper dispersion of the oxygen in the water.

The foregoing objects, as well as other objects annd advantages will be seen from the following disclosure of the present invention.

SUMMARY OF THE INVENTION

According to the present invention a portable container is provided comprising a flexible tank like cylindrical body enclosed with a bottom plate and a top cover and adapted to receive water to a give level, and to hold oxygen in an air chamber formed above the level of water. The body has a cut-out formed along a lower portion thereof, which is covered by an outer flexible wall which is sealingly connected, as by welding at its side edges to the cylindrical body and at its lower edge to the bottom plate at its circumferential edge, while being open adjacent the top cover. Since the upper edge of the outer flexible wall is not attached to anything, the outer wall forms a pocket with the container, which is capable of being moved relative to the container wall and thereby allows access to the interior of the container via the cut-out.

Preferably, the cut-out is formed in the lower portion of the body, so as to be below the normal water level when supplied to the container. Therefore, when the outer wall is moved relative to the body, the oxygen contained in the chamber above the water is not lost to the ambient air due to the interposition of the water between the cut-out and the supply of oxygen.

The portable container of the present invention is also supplied with a flexible cover plate which has at least one plug for the passage of a hose therethrough. An air pump may be supplied with the container which air pump has two hose elements for insertion into the body. By connecting one hose element to the suction side of the air pump and the other hose element to the discharge side of the air pump, the oxygen may be forcibly circulated in the container upon the operation of the air pump.

The cut-out of the container may be augmented with at least one vertical slit which prevents the build-up of water between the outer wall and the container wall, which might otherwise prevent the separation of the outer wall from the body due to surface tension.

The body of the portable container of the present invention may also be supplied with a nipple for receiving a drain hose. The nipple is preferably positioned diametrically opposite to the cut-out in the body so that when it is desired to empty the container all that is required is that the plug on the cover plate be opened to ambient air and the container tilted to allow for the draining of the container. Holding means is provided for holding the hose to the container wall in a closed condition when draining is not in process.

Full details of the present invention are set forth in the following description and in the accompanying drawings.

BRIEF DESCRIPTION OF THE DRAWINGS

In the accompanying drawings:

FIG. 9 is a perspective view similar to FIG. showing another embodiment of the portable container, FIG. 10 is a sectional view taken along line X—X of FIG. 9.

DETAILED DESCRIPTION OF THE INVENTION

Figure 1:
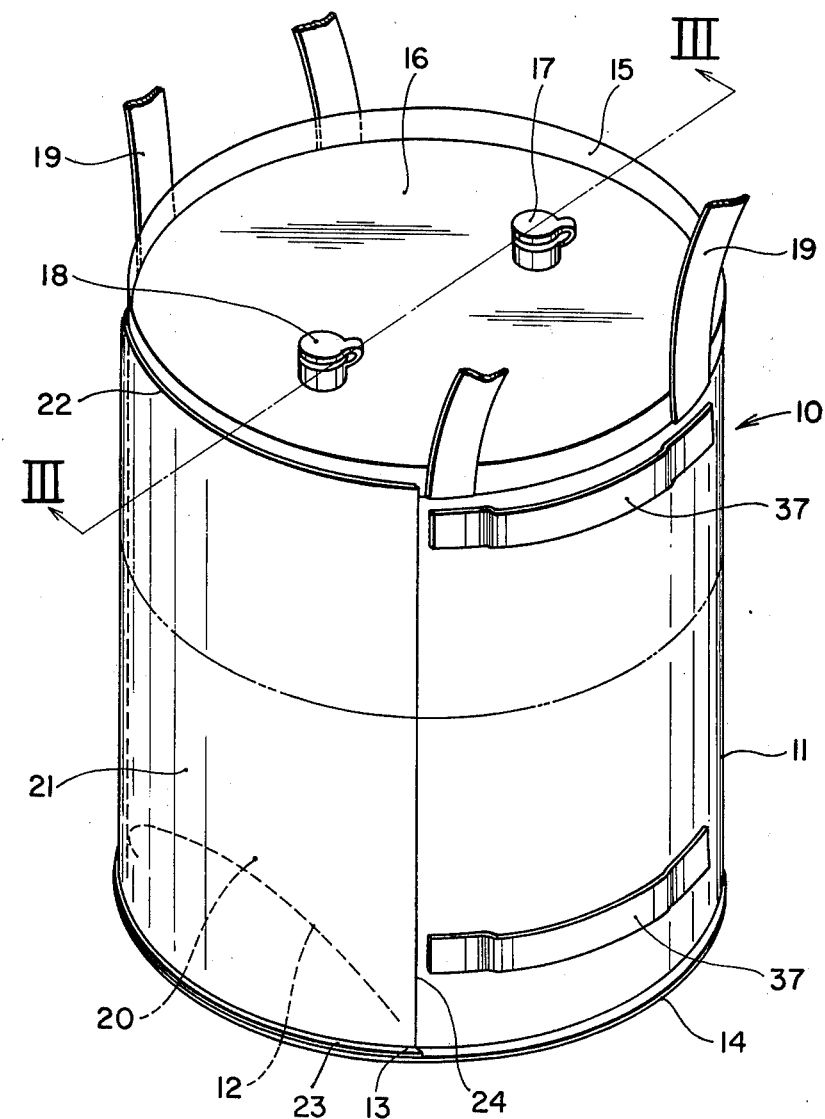
FIG. 1 is a perspective view showing the portable container of the present invention.
Figure 2:
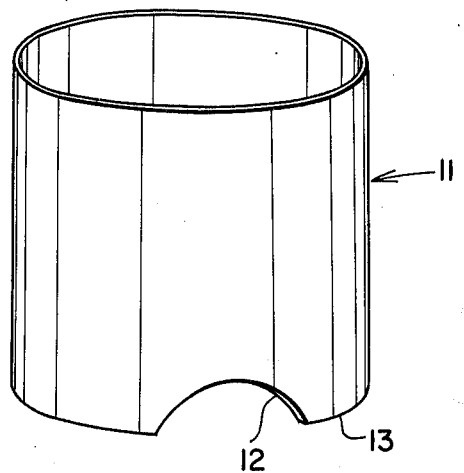
FIG. 2 is a perspective view showing the cylindrical body.
Figure 3:
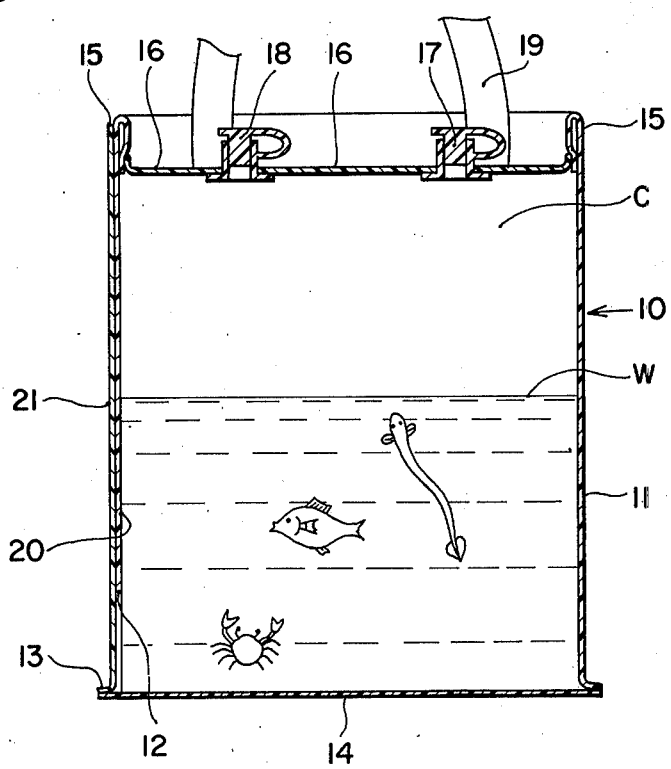
FIG. 3 is a sectional view taken along line III—III of FIG. 1.

Referring now to FIGS. 1–8 showing a first embodiment, the apparatus for transportation of fish, bait or the like according to the present invention comprises a container generally indicated by reference character 10, formed of a flexible cylindrical body 11 preferably of vinyl or the like, having an arcuate, preferably semi-circular shaped, cut-out 12 which extends from the lower circumferential edge 13 upwardly (i.e. axially) as can be seen in FIG. 2. The lower circumferential edge 13 of the cylindrical body is joined as by heat sealing, or high frequency welding to a flexible bottom plate 14. The upper circumferential edge of the cylindrical body 11 is rolled over into a bent flange 15 and sealed at its edge to the wall of the cylinder. The flange 15 receives therein a flexible cover plate 16 which as shown in FIG. 3 is attached by heat sealing or by high frequency welding, to the edge of the cylinder body forming the lower portion of the flange 15. Therefore, the flexible cover plate 16 is not separable from the cylindrical body 11 but is capable of relative movement thereto by virtue of its flexibility. The cover plate is provided with a pair of openings each closed by removable plugs 17 and 18. The holes are positioned symmetrically along a diametric axis and the plugs are each capable of being opened for the passage therethrough of a hose element enabling the supply of fresh or salt water to the container as well as oxygen as will be hereinafter described. Carrier straps 19 are attached to the inner surface of the rolled flange 15 so that the container may be easily carried and transported. In general the container is adapted to be filled with water to a suitable level W, filled with fish bait or the like thereafter supplied with an amount of oxygen in the chamber C formed between the water level W and the cover 16 and sealed by inserting the plugs 17 and 18.

On the longitudinal portion of the cylindrical body 11 illustrated by the dotted lines 20, corresponding to the section containing the cut-out 12, there is mounted a flexible outer wall member 21 which has an upper edge 22 extending near to but not attached to the flange 15 and a lower edge 23 bent outwardly and sealingly attached to the circumferential edge of the bottom plate 14. The outer wall 21 is attached along its longitudinal edges 24 to the cylindrical body 11 so that it conforms to the circumferential arc of the body 11 and completely covers the cut-out 12 whereby under most ordinary conditions the pressure of the water and fish in the cylindrical body 11 act to press the wall of the body 11 and that of the outer wall member together to completely seal the interior from the ambient air. It will also be appreciated that the outer wall can be a unitary part of the cylinder body and an inner separable wall formed with a cut-out position secured, as by welding to the interior of the body, in a reverse manner to that shown in the drawings. What is significant is that the body be provided with a double wall which lie contiguous so as to provide a seal under effect of the water pressure in the container.

Figure 4:
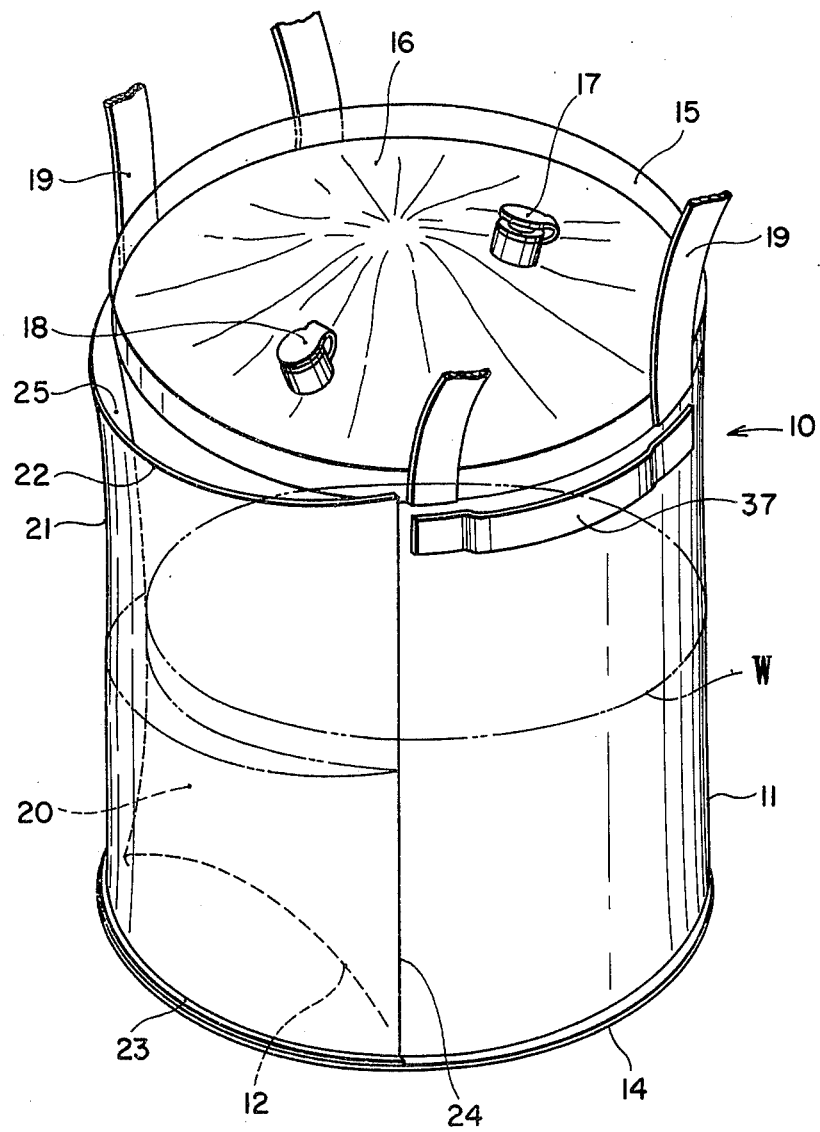
FIG. 4 is a perspective view similar to FIG. 1 showing the portable container in its opened condition.

Since the lower edge 23 of the outer wall 21 is sealed to the circumferential edge of the bottom plate 14 as can be seen in FIG. 3, and its two side edges 24 are also sealed to outer circumferential portion of the body 11 while the upper edge 22 of the outer wall 21 is left free of the flange 15, a pocket 25 is formed between the outer wall 21 and the body 11, as indicated by FIG. 4. By pulling the upper edge 21 away from the flange 15 and/or by distorting inwardly the body 11, the pocket opens, forming a passageway or funnel providing access to the interior of the cylindrical body 11 via the cut-out 12. Under normal conditions the seal between the body 11 and the outer wall 21 is sufficient to maintain the pocket closed and to prevent the oxygen contained in the chamber C from being forced out and lost even when, however, the pocket is opened allowing access into the body, no oxygen is lost, since the cut-out 12 lies below the water level W in the container and below the chamber C containing the oxygen, the water itself providing an ample seal against escape of oxygen.

The outer wall 21 may be easily separated from the body 11 so as to form the access pocket to the interior of the container, even when filled with water, by lifting the cover plate 16 upwardly as illustrated in FIG. 4, by manually gripping the plugs 17 and 18. An upward pull on the plugs lowers the pressure within the container and a partial vacuum is formed thereby forcing the inward movement of the body 11 away from the outer wall 21.

The embodiment discussed thus far is used as follows:

Fresh or salt water is supplied to the interior of the cylindrical body 11 by introducing the same through one of the openings in the cover or through the pocket 25. After the water has been supplied, the upper edge 22 of the outer wall is allowed to return to contact with the flange 15 creating the seal about the cut-out 12. Then air is withdrawn from the interior of the body 11 via the plugs 17 and 18 and replaced with fresh oxygen again through the plugs 17 and 18 from a suitable source. After the proper amount of oxygen has been injected, the plugs 17 and 18 are again closed off. Introduction of fish into the container is accomplished by pulling up on the plugs 18 and 19 which, as explained above, forces open the pocket 25 allowing the fish to be inserted into the container. When it is desired to take fish from the container, the plugs 17 and 18 may again be pulled upwardly and a hand may then be inserted into the pocket 25 and into the cut-out 12. No loss of oxygen occurs since the water is interposed between the air chamber C and the cut-out 12. After the fish have been removed, the cover plate is allowed to take its horizontal form and thereby return the container to its normal condition.

During transport, the container is left in its vertical position and since the oxygen contained in the air chamber C is not easily soluble in the water, only the surface of the water at level W tends to receive the oxygen, leaving the lower portions of the water with insufficient oxygen. In order to overcome this, the present invention provides an air pump and air pump holder which may be used to forcibly circulate the oxygen in the water.

Figure 5:
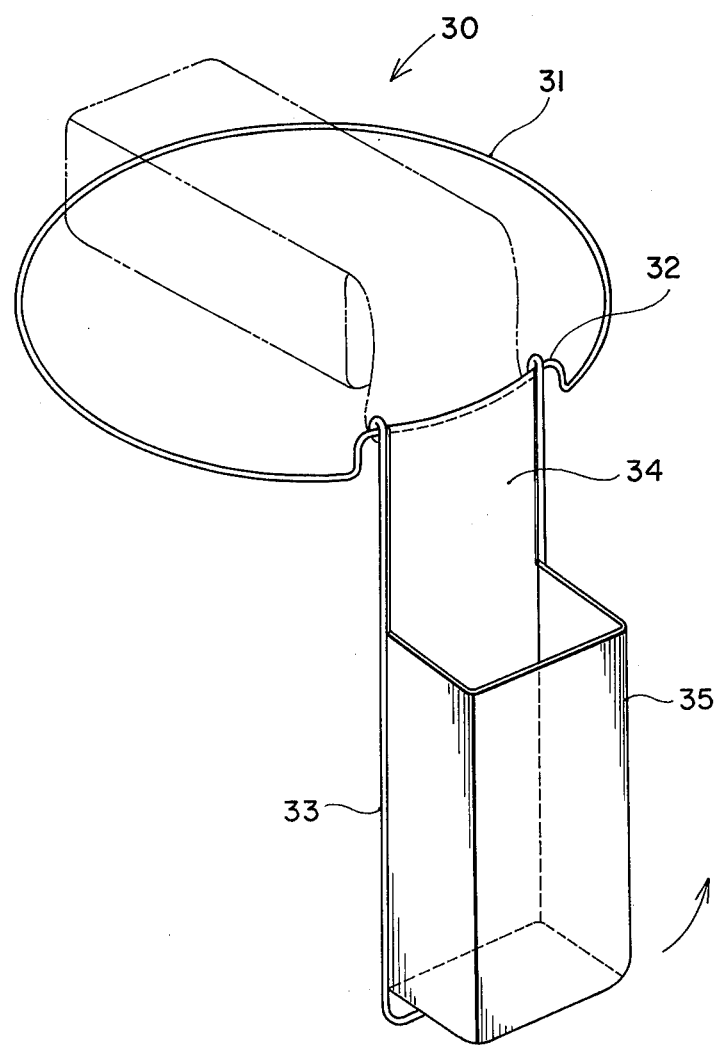
FIG. 5 is a perspective view showing a pump holder for attachment to the side of the portable container of the present invention.
Figure 6:
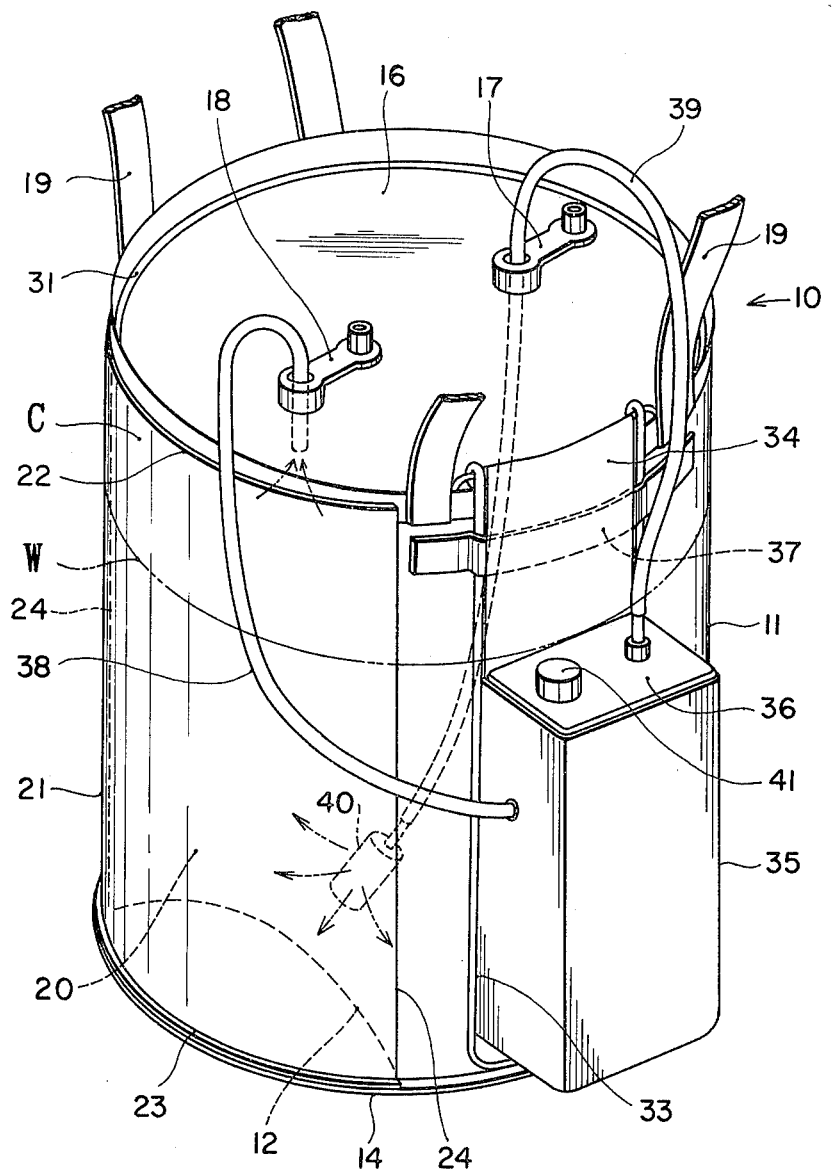
FIG. 6 is a perspective view showing the pump holder of FIG. 5 and as a pump attached to the container of FIG. 1.
Figure 7:
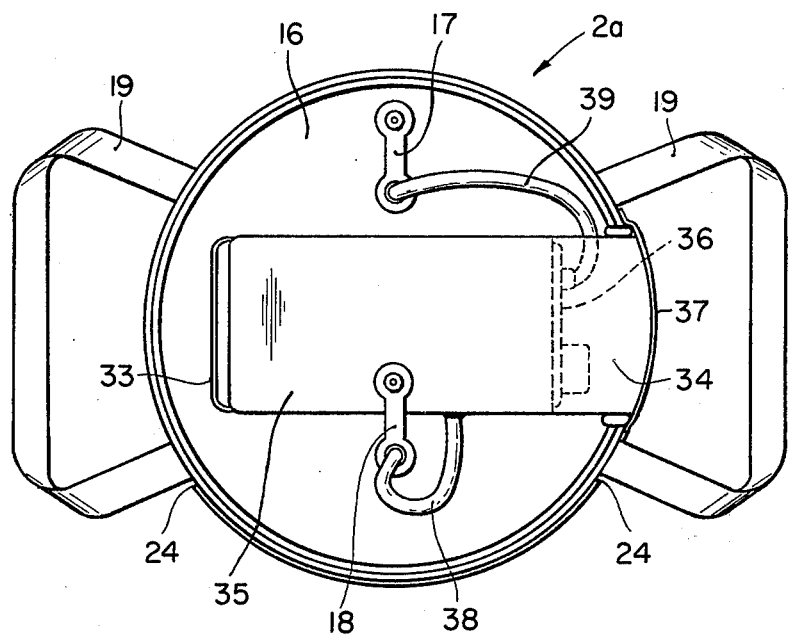
FIG. 7 is a top plan view showing the pump holder as an air pump in a carrying position.

In FIG. 5 there is shown an air pump holder 30 comprising a rigid ring 31 having an outer circumference approximately equal to the inner circumference of the flange 15 so that the ring 31 may fit snugly therein. The ring 31 has a upstanding supporting edge 32 of the same height as the flange 15 on which is pivotally mounted a U-shaped bracket 33 adapted to depend along the exterior of the cylindrical body 11, substantially the entire height of the container. Fixed to the upstanding supporting edge 32 is a flexible flap 34 to which is fixed a bag 35 adapted to receive an air pump 36 (FIG. 6). As can best be seen in FIG. 6, the cylindrical body 11 has formed along its wall at least one flexible band 37 for holding therein the bracket 33. The pump holder 30 is placed in use by inserting the ring 31 within the flange 15 and inserting the bracket 33 within the bands 37. The flap 34 and bag 35 holding the pump 36 thus lie over the bands 37. When the pump 36 is not being used, the bag 35 and flap 32 may be merely turned over onto the cover plate 16 with or without the pump inside to be between the plugs 17 and 18 as shown in phantom lines in FIG. 5 and full lines in FIG. 7.

The rigid ring 31 provides an elastic force against the flange 15, when inserted therein, which acts to maintain the hermetic seal between the cover 16 and the body 11 and prevents distortion of the upper portion of the container. The depending bracket 33, extending from the upper flange 15 along the length of the body 11, acts to stabilize and strengthen the container so that it does not collapse. The lower edge of the bracket 33 normally rests on the ground, thus taking a substantial portion of the load of the container, as well as of the pump housed in the bag 35.

The air pump 36 has a first tube 38 connected to the suction side of the air pump extending into the container through the open plug 18 and a second tube 39 connected to the discharge or pressure side inserted into the container through the open plug 17. The tube 39 is provided with an air diffuser or filter 40 at its end, set well below the water level "W". When it is desired to forcibly circulate the oxygen within the water the air pump 36 is turned on at its switch 41 thereby sucking oxygen from the air chamber "C" through the tube 38 and exhaust it back into the container via the tube 39 deep below the water level W.

Figure 8:
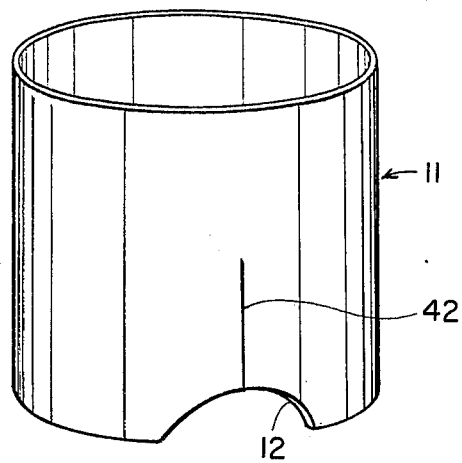
FIG. 8 is a perspective view similar to that of FIG. 2 showing a modification of the cylindrical body.

At times it may be that the lower portion of the outer wall 21 may not be capable of being separated from the body 11 due to surface tension caused by water contained between outer wall 21 and the wall 11. This is quite common when the water in the container is far above the cut-out 12. To prevent such from happening one or more axial slits 42 may be formed in the body 11 as shown in FIG. 8. The vertical slits 42 extend from the cut-out 12 upwardly toward the normal water level W so that when the wall 11 is bent as by the pulling up of the cover plate 16, the slit or slits 42 allow the water positioned between the outer wall 21 and the body 11, to drain. The slit or slits 28 also serve to facilitate the insertion of a hand into the container for the removal of fish, by allowing easier access to the interior of the container.

In order to protect the fish in the container from sunlight and prevent the water from heating to a dangerous temperature, a shade may be placed over the cover plate 16.

Figure 11:
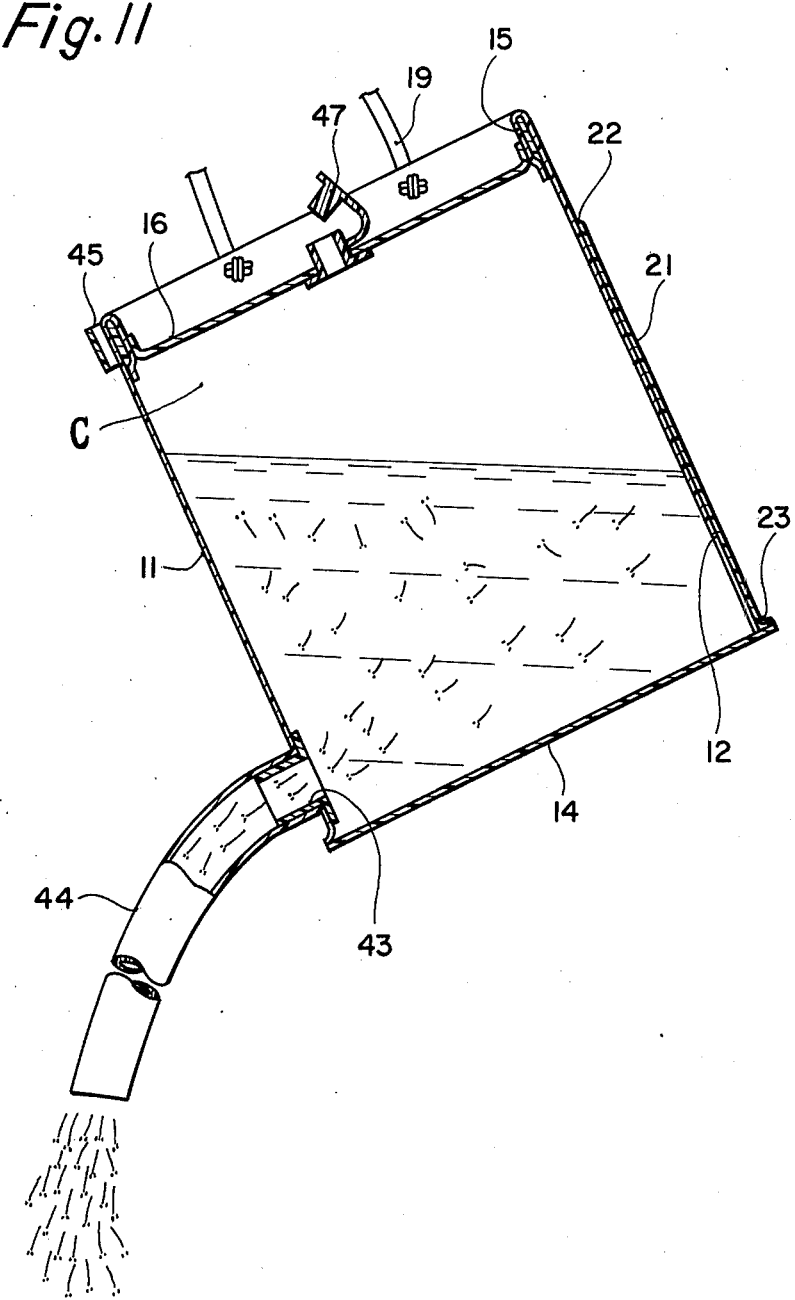
FIG. 11 is a view similar to FIG. 10 where the portable container is shown draining its contents.

FIGS. 9-11 show a slight modification of the portable container which is expressly designed for transporting young fish for stocking a stream. The container of FIGS. 9-11 differs from that of FIGS. 1-8 in that along the lower edge on the outer portion of the body 11 diametrically opposite the cut-out 12 there is mounted tubular nipple 43 to which is attached a flexible drain hose 44 by which the contents of the container may be drained. The flexible drain hose 44 is movable into an inoperative position where it is inserted through a band 45 attached to the outer circumference of the flange 15 and held firmly in place by a clip 46, as shown in FIGS. 9 and 10. As indicated in FIGS. 9 and 10, the cover 16 may be provided with a single opening at the center closed by a plug 47, although the two openings of the previous embodiments may also be used. The carrying straps may also be simplified. When it is desired to drain the container of its contents, such as when stocking a stream, the hose is removed from the clip 46 and positioned into a drain position as shown in FIG. 11. The plug 47 is then opened and the container may then be tilted to force the water and fish out. The container is readily suitable for cryostat transportation by placing the container in a cooler. Although not shown in the figures, the container of this embodiment may also be provided with an air pump holder and air pump as described above. The pressure tube of the pump may be inserted through the drain.

It will be seen from the foregoing description that the present invention provides a lightweight, highly portable container, which may be easily filled with water, oxygen and fish bait or the like. The container may be repeatedly opened for refilling and removal of fish or bait without breaking the seal to the oxygen chamber. Manual entry into the interior is easily permissible, as well as removal through a drain hose. The provision of an oxygen circulating system, as well as possible replacement of the circulating system with a supply of oxygen itself enables the container to be used in long distance transportation. The container is also small enough to be inserted into refrigerators and refrigerator vans.

While specific embodiments of the invention have been shown and described, it is to be understood that numerous changes and modifications may be made without departing from the spirit and scope of the invention.

What is claimed is:

1. Apparatus for the transport of fish, bait or the like comprising a container having a body, a portion of which is formed with a contiguous double wall and having a bottom plate, a cover plate sealed therewith, the lower edge of the inner one of said double walls of said body being separate from the bottom plate, the upper edge of the outer one of said double wall being separate from the cover plate, said wall members being flexible relative to each other to form a closable pocket allowing access to the interior of said container.

2. Apparatus for the transport of fish, bait or the like comprising a container having a body formed of a flexible unitary cylinder sealed at each end to a cover plate respectively and formed with a cut-out portion along its bottom circumferential edge, and a contiguous outer flexible member overlying said cylinder and said cut-out.

3. The apparatus according to claim 2 wherein said outer flexible wall comprises an upper edge, a lower edge, and a pair of side edges, said lower edge being attached to said bottom plate and said pair of side edges being attached to said body, the circumferential width of said outer flexible wall being greater than the circumferential span of said cut-out so that said pair of edges are attached to said body beyond the extremities of said cut-out.

4. The apparatus according to claim 3 wherein said upper circumferential edge of said body is formed by a bent flange, said cover plate being flexible and being attached to said bent flange along the circumference thereof.

5. The apparatus according to claim 2, wherein said cut-out extends from said lower circumferential edge of said body upwardly in a direction toward said upper circumferential edge only partially of axial length of said body.

6. The apparatus according to claim 5, wherein said body further comprises at least one slit extending axially from said cut-out upwardly in a direction toward said upper circumferential edge so that water stored between said body and said outer flexible wall is drained each time said outer wall is moved from said body.

7. The apparatus according to claim 2 including an air pump mounted on a portion of said container, a pump holder for mounting said air pump therein, and means on said container for mounting said air pump and said pump holder.

8. The apparatus according to claim 7, wherein said means on said container for mounting said air pump and said pump holder comprises at least one flexible band, and said pump holder comprises a rigid ring positioned in said bent flange above said cover plate and having an outer diameter approximately equal to the inner diameter of said bent flange, said rigid ring having a supporting edge extending upwardly at a height equal to the height of said bent flange, a leg portion having a first end pivotally mounted to said supporting edge and a second end spaced from said first end, a bag for the reception therein of said air pump and an extension extending from said bag and formed integrally with a portion of said leg portion, said extension being pivotally mounted to said supporting surface, whereby said leg portion is mounted in said at least one flexible band when said air pump is in use and said leg portion along with said extension and socket are pivoted upwardly about said supporting edge onto said cover plate when said air pump is not in use.

9. The apparatus according to claim 8, wherein said cover plate is provided with two plugs and said air pump comprises a first hose connected at one end to the suction side of the air pump and another end mounted in one of said plugs and a second hose having one end connected to the discharge side of the air pump and another end mounted in the other of said plugs, whereby the oxygen contained in said container element is forcibly circulated by operating said air pump.

10. The apparatus according to claim 9, wherein said other end of said second hose is positioned below the water level in said container element.

11. The apparatus according to claim 1, wherein said container includes a sleeve mounted in the lower portion of said container element diametrically opposite to said cut-out, a drain hose having a first end mounted on said sleeve and a second end spaced from said first end, and means for holding said second end of said drain hose to said container element when said hose is not used, said hose being used to drain said container element.

12. The portable container for fish according to claim 11, wherein said means for holding said second end of said hose to said element comprises a band mounted on a portion of said upper circumferential edge, and a clip for holding said second end in said band.

* * * * *